United States Patent
Lee et al.

(10) Patent No.: US 10,048,544 B2
(45) Date of Patent: Aug. 14, 2018

(54) DISPLAY PANEL INCLUDING RECEIVING PORTION IN SEALING MEMBER AND FABRICATION METHOD THEREOF

(71) Applicant: Samsung Display Co., Ltd., Yongin, Gyeonggi-Do (KR)

(72) Inventors: Jun Hee Lee, Yongin-si (KR); Eok Su Kim, Yongin-si (KR); Won Jin Kim, Yongin-si (KR); Ju Yong Park, Yongin-si (KR); Jung Chul Woo, Yongin-si (KR); Sun Hee Lee, Yongin-si (KR); Hyun Wook Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 50 days.

(21) Appl. No.: 14/983,794

(22) Filed: Dec. 30, 2015

(65) Prior Publication Data

US 2016/0341995 A1   Nov. 24, 2016

(30) Foreign Application Priority Data

May 18, 2015   (KR) .......................... 10-2015-0068745

(51) Int. Cl.
  *G02F 1/1339* (2006.01)
  *G02F 1/1341* (2006.01)
  *G02F 1/161* (2006.01)
  *G02F 1/01* (2006.01)

(52) U.S. Cl.
  CPC .......... *G02F 1/1339* (2013.01); *G02F 1/1341* (2013.01); *G02F 1/161* (2013.01); *G02F 1/0107* (2013.01)

(58) Field of Classification Search
  CPC ....... G02F 1/1339; G02F 1/161; G02F 1/0107
  See application file for complete search history.

(56) References Cited

U.S. PATENT DOCUMENTS

| | | | | |
|---|---|---|---|---|
| 5,037,185 A | * | 8/1991 | Grupp | G02F 1/1339 349/153 |
| 5,517,344 A | * | 5/1996 | Hu | G02F 1/1339 349/149 |
| 7,804,563 B2 | | 9/2010 | Nakamura | |

(Continued)

FOREIGN PATENT DOCUMENTS

| KR | 1020070120231 A | 12/2007 |
|---|---|---|
| KR | 1020080072953 A | 8/2008 |
| KR | 1020120018978 A | 3/2012 |

*Primary Examiner* — Kendrick Hsu
(74) *Attorney, Agent, or Firm* — Cantor Colburn LLP (57) ABSTRACT

A display panel includes a first display substrate including a display area and a non-display area which is at a periphery of the display area, a second display substrate facing the first display substrate, a display device in the display area between the first and second display substrates and including a first electrode, an optical layer including an optical layer material, and a second electrode, and a sealing member which is disposed in the non-display area and attaches the first and second display substrates to each other. The sealing member defines a sealing portion thereof which restricts movement of the display area optical layer material to outside the display area, and a receiving portion thereof in which the optical layer material is receivable.

17 Claims, 7 Drawing Sheets

(56) References Cited

U.S. PATENT DOCUMENTS

2004/0183987 A1* 9/2004 Suzuki ................. G02F 1/1339
349/153
2005/0088605 A1* 4/2005 Chung ................. G02F 1/1339
349/154

* cited by examiner

DISPLAY PANEL INCLUDING RECEIVING PORTION IN SEALING MEMBER AND FABRICATION METHOD THEREOF

This application claims priority to Korean Patent Application No. 10-2015-0068745, filed on May 18, 2015, and all the benefits accruing therefrom under 35 U.S.C. § 119, the entire content of which is incorporated herein by reference in its entirety.

BACKGROUND

1. Field

Exemplary embodiments relate to a display panel and a method for manufacturing the same.

2. Description of the Related Art

Generally, liquid crystal display panel, an electrophoretic display panel and an electro-wetting display panel are types of a non-emissive display panel. The non-emissive display panel may adjust light transmittance therethrough by the behavior of an optical layer disposed between two display substrates thereof. In the non-emissive display panel, an image may be implemented by adjusting the light transmittance through the optical layer.

Accordingly, the non-emissive display panel may include optical layer material included in the optical layer at an optimal volume.

SUMMARY

One or more exemplary embodiment provides a display panel including an optical layer material at an optimal volume in a display area of the display panel.

One or more exemplary embodiment also provides a method of manufacturing the display panel for which optical layer material is at an optimal volume in a display area of the display panel.

In an embodiment, a display panel includes a first display substrate including a display area and a non-display area which is at a periphery of the display area, a second display substrate facing the first display substrate, a display device in the display area between the first display substrate and the second display substrate and including a first electrode, an optical layer including an optical layer material, and a second electrode, and a sealing member which is disposed in the non-display area and attaches the first display substrate and the second display substrate to each other. The sealing member defines a sealing portion thereof which restricts movement of the display area optical layer material to outside the display area, and a receiving portion arranged in plural along the display area and in which the optical layer material is receivable.

For a reference volume of the optical layer material defined for the display area, an entirety of the receiving portions may receive the optical layer material in a range of about 2 volume percent (vol %) to about 10 vol % of the reference volume. The sealing member may define two to ten of the receiving portions. Each of the receiving portions may receive the optical layer material in an amount of about 1 vol % of the reference volume of the optical layer material defined for the display area.

The sealing member may include a photo curable material or a thermo curable material.

The optical layer may include a plurality of liquid crystals. The first electrode may be disposed in the first display substrate and the second electrode may be disposed in the second display substrate.

In an embodiment, a method for manufacturing a display panel may include providing a first display substrate by forming a thin film transistor on a first base substrate, the first display substrate including a display area and a non-display area which is at a periphery of the display area, forming a first electrode on the first display substrate, the first electrode contacting the thin film transistor in the first display substrate, forming a second electrode on a second display substrate including a second base substrate, disposing an optical layer including an optical layer material, in the display area and between the first electrode and the second electrode, and attaching the first display substrate and the second display substrate to each other using a sealing member in the non-display area. The sealing member defines a sealing portion thereof which borders the display area and restricts movement of the display area optical layer material to outside the display area, and a plurality of receiving portions thereof arranged along the display area and in which the optical layer material is receivable.

The method may further include, with respect to a reference volume of the optical layer material defined for the display area, measuring a volume of the optical layer material in the display area, and determining whether a volume of the display area optical layer material exceeds the reference volume.

The method may further include redistributing the display area optical layer material if the volume of the display area optical layer material exceeds the reference volume.

The redistributing of the display area optical layer material may include connecting a volume of the display area to a volume of a receiving portion among the plurality of receiving portions by removing a portion of the sealing member at the border of the display area, the portion of the sealing member defining the receiving portion, and moving an amount of the display area optical layer material to the receiving portion of which the volume thereof is connected to the volume of the display area.

In one or more exemplary embodiment, the display panel as described above may include the optical layer material as an optimal (reference) volume in the display area. Therefore, the optimal volume of the optical layer material in the display area may reduce or effectively prevent a display quality defect of the display panel which may occur due to the volume of the optical layer material in the display area exceeding the reference volume.

Also, the method for manufacturing the display panel may easily overcome a display quality defect by redistributing the display area optical layer material to outside of the display area through a relatively simple process, when the volume of the display area optical layer material is in excess of the reference volume.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive.

In addition, it will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section, a second element, component, region, layer or section could be termed a first element, component, region, layer or section, and so forth, without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. As used herein, the term "and/or" includes any and all combinations of one or more of the associated listed items. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Referring to FIGS. 1 to 4, an exemplary embodiment of a display panel 100 may include a display area DA in which an image is displayed and a non-display area NDA at a periphery of the display area DA and in which an image is not displayed. The display area DA may include a plurality of pixel areas PA. The plurality of pixel areas PA may be arranged in matrix form.

The display panel 100 may include a first display substrate 110, a second display substrate 120 facing the first display substrate 110, a display device DD disposed between the first display substrate 110 and the second display substrate 120 and a sealing member 130 that attaches the first display substrate 110 and the second display substrate 120 to each other.

The first display substrate 110 may include a first base substrate SUB1 and at least one thin film transistor which is disposed on the first base substrate SUB1. The first display substrate 110 may otherwise be referred to as a thin film transistor substrate.

The first base substrate SUB1 may include a transparent insulating material. Thus, light may pass through the first base substrate SUB1.

The first base substrate SUB1 may be a rigid substrate. In an exemplary embodiment, for example, but without limitation thereto, the first base substrate SUB1 may be any one of a glass base substrate, a quartz base substrate, a glass ceramic base substrate or a crystalline glass base substrate.

The first base substrate SUB1 may be a flexible substrate. The first base substrate SUB1 may be any one of a film base substrate or a plastic base substrate which includes polymolecular organic matter. In an exemplary embodiment, for example, but without limitation thereto, the first base substrate SUB1 may include any one of polyethersulfone ("PES"), polyacrylate, polyetherimide ("PEI"), polyethyelene naphthalate ("PEN"), polyethylene terephthalate ("PET"), polyphenylene sulfide ("PPS"), polyarylate ("PAR"), polyimide ("PI"), polycarbonate ("PC"), triacetate cellulose ("TAC" or cellulose acetate propionate ("CAP"). A material of the first base substrate SUB1 may have resistance (such as thermal resistance) with respect to a relatively high processing temperature used in a manufacturing process.

Figure 3:
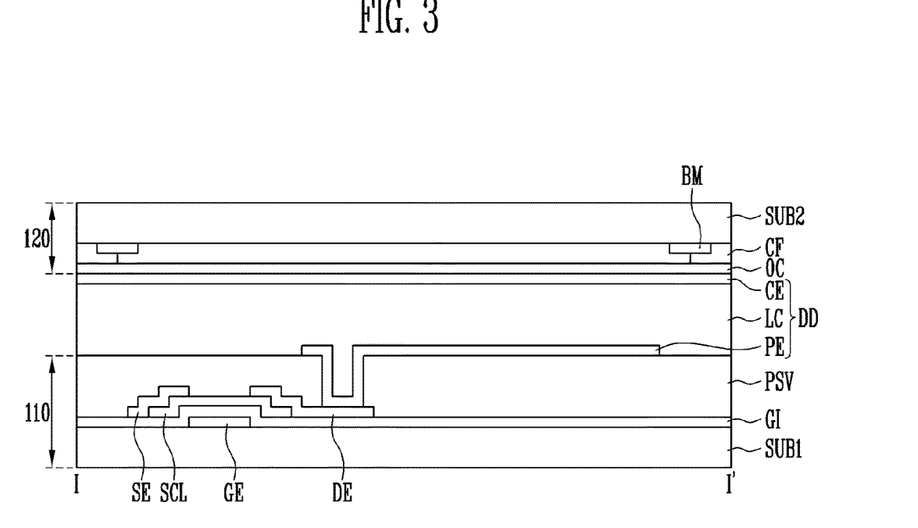
FIG. 3 is a cross-sectional view along line I-I' shown in FIG. 2.

The thin film transistor may be disposed in the pixel area PA on the first base substrate SUB1. The thin film transistor may include a gate electrode GE, a semiconductor layer SCL, a source electrode SE and a drain electrode DE.

The gate electrode GE may be disposed on the first base substrate SUB1. Also, the gate electrode GE may be coupled to a gate line. In an exemplary embodiment, for example, but without limitation thereto, the gate electrode GE may have a shape defined by a protruded portion of the gate line.

A gate insulating layer GI may be disposed between the gate electrode GE and the semiconductor SCL. The gate insulating layer GI may insulate the gate electrode GE and the semiconductor layer SCL from each other. The gate insulating layer GI may include at least one of silicon oxide (SiOx) or silicon nitride (SiNx). In an exemplary embodiment, for example, but without limitation thereto, the gate insulating layer GI may collectively include a first layer disposed on the gate electrode GE and the gate line and which includes silicon oxide, and a second layer disposed on the first layer and which includes silicon nitride.

The semiconductor layer SCL may be disposed on the gate insulating layer GI and overlap the gate electrode GE. The semiconductor layer SCL may include one of amorphous silicon (a-Si), polycrystalline silicon (p-Si) or an oxide semiconductor. The oxide semiconductor may include at least one of Zn, In, Ga, Sn or any combination thereof. In an exemplary embodiment, for example, but without limitation thereto, the oxide semiconductor may include indium-gallium-zinc oxide ("IGZO").

An area of the semiconductor layer SCL which contacts the source electrode SE and the drain electrode DE may be referred to as a source area and a drain area, respectively, into which impurities are doped or injected. An area between the source area and the drain area may be referred to as a channel area. The channel area may be exposed between the source electrode SE and the drain electrode DE which are spaced apart from each other.

One end of the source electrode SE may contact a data line crossing the gate line. In an exemplary embodiment, for example, but without limitation thereto, the source electrode SE may have a shape defined by a protruded portion of the data line. An end of the source electrode SE opposing the one end thereof may contact a first end of the semiconductor layer SCL.

The drain electrode DE may be arranged spaced apart from the source electrode SE. One end of the drain electrode DE may contact a second end of the semiconductor layer SCL opposing the first end thereof. An end of the drain electrode DE opposing the one end thereof may contact the display device DD.

In the above-described exemplary embodiment, an example was given in which the thin film transistor has a bottom gate configuration. However, the invention is not limited thereto. In an exemplary embodiment, for example, but without limitation thereto, the thin film transistor may have top gate configuration.

The first display substrate 110 may further include a protective layer PSV disposed on the thin film transistor. The protective layer PSV may cover the thin film transistor and expose the end of the drain electrode DE opposing the one end thereof.

The protective layer PSV may include at least one of an inorganic insulating layer or an organic insulating layer. In an exemplary embodiment, for example, but without limitation thereto, the protective layer PSV may collectively include an inorganic insulating layer covering the thin film transistor and an organic insulating layer disposed on the inorganic insulating layer.

The inorganic insulating layer may include at least one of silicon oxide (SiOx) or silicon nitride (SiNx). In an exemplary embodiment, for example, but without limitation thereto, the inorganic insulating layer may collectively include a first layer including silicon oxide covering the thin film transistor and a second layer disposed on the first layer and including silicon nitride.

The organic insulating layer may collectively include organic insulating material. Thus, light may pass through the organic insulating layer. In an exemplary embodiment, for example, but without limitation thereto, the organic insulating layer may include at least one of a polyacrylate resin, epoxy resin, phenolic resin, polyamide resin, polyimide resin, unsaturated polyester resin, poly-phenylene ether resin, poly-phenylene sulfide resin, or benzocyclobutene resin.

The display device DD may be disposed on the protective layer PSV and contact the end of the drain electrode DE opposing the one end thereof. The display device DD may be any one of liquid crystal display device ("LCD" device), electrophoretic display device ("EPD" device), electro-wetting display device ("EWD" device) or organic light emitting display device ("OLED" device). For convenience in illustration, the liquid crystal display device is described as the display device DD as an example. Also, although not shown in the drawings, the display device DD may display an image using light from an external device, for example, but without limitation thereto, using light provided from a backlight unit including a light source therein.

The display device DD may include a first electrode PE, a second electrode CE forming an electric field with the first electrode PE, and an optical layer LC capable of allowing light to pass therethrough or blocking the light by operation of the electric field thereon.

The first electrode PE may be disposed on the protective layer PSV and may be coupled to the end of the drain electrode DE opposing the one end thereof. Also, the first electrode PE may include a transparent conductive oxide. In an exemplary embodiment, for example, but without limitation thereto, the first electrode PE may include at least one of indium tin oxide ("ITO"), indium zinc oxide ("IZO"), aluminum zinc oxide ("AZO"), gallium doped zinc oxide ("GZO"), zinc tin oxide ("ZTO"), gallium tin oxide ("GTO") or fluorine doped tin oxide ("FTO").

The second electrode CE may be insulated from the first electrode PE. The second electrode CE may include a material that is the same as the first electrode PE. Also, the second electrode CE may be applied with a common voltage provided from an external device (not shown). The second electrode CE may be disposed on one surface of the second display substrate 120 where the one surface faces the first display substrate 110.

The optical layer LC may include a plurality of liquid crystals. That is, the optical layer LC may be a liquid crystal layer. The liquid crystals may be arranged in a certain direction due to the electric field formed by the first electrode PE and the second electrode CE and adjust transmittance of light therethrough. Therefore, the optical layer LC may cause the light provided from the backlight unit to pass therethrough, thereby allowing the display panel 100 to display images.

The optical layer LC material included in the optical layer LC may be arranged at a volume within the allowed scope in the display area DA, e.g., within the scope of a reference volume. If the optical layer LC material exceeds the reference volume, the image implemented at the display panel 100 may exhibit a yellowish phenomenon as a display defect.

Even though the display device DD is described as including the first electrode PE, the second electrode CE and the optical layer LC which is positioned between the first electrode PE and the second electrode CE, the invention is not limited thereto. In an exemplary embodiment, for example, but without limitation thereto, the display device DD may have a structure in which the first electrode PE and the second electrode CE are both disposed within the first display substrate 110 and the optical layer LC is disposed between the first electrode PE and the second electrode CE of the first display substrate 110, and the second display substrate 120. Here, the at least one of the first electrode PE or the second electrode CE may include a plurality of slits.

The second display substrate 120 may be a substrate member which faces the first display substrate 110. The second display substrate 120 may include a second base substrate SUB2, a light blocking pattern BM, a color filter CF and an over-coating layer OC. The second display substrate 120 may otherwise be referred to as an opposing substrate 120.

The second base substrate SUB2 may include a material that is the same as the first base substrate SUB1. That is, the second base substrate SUB2 may be a rigid substrate or a flexible substrate.

The light blocking pattern BM may be disposed on a surface of the second base substrate SUB2 facing the first display substrate 110. The light blocking pattern BM may be disposed corresponding to a boundary of the pixel areas PA. Also, the light blocking pattern BM may reduce or effectively prevent light-leaking phenomenon due to mis-arrangement of the liquid crystals of the optical layer LC.

The color filter CF may provide light in one of the colors red, green, blue, cyan, magenta or yellow. The color filter CF may be arranged, corresponding to the pixel area PA. Although the color filter CF is described as being included in the second display substrate 120, the invention is not limited thereto. In an exemplary embodiment, for example, the color filter CF may be included in the first display substrate 110.

The over-coating layer OC may cover the color filter CF and reduce a height (e.g., step) difference due to the light blocking pattern BM and the color filter CF disposed adjacent to each other.

Figure 1:
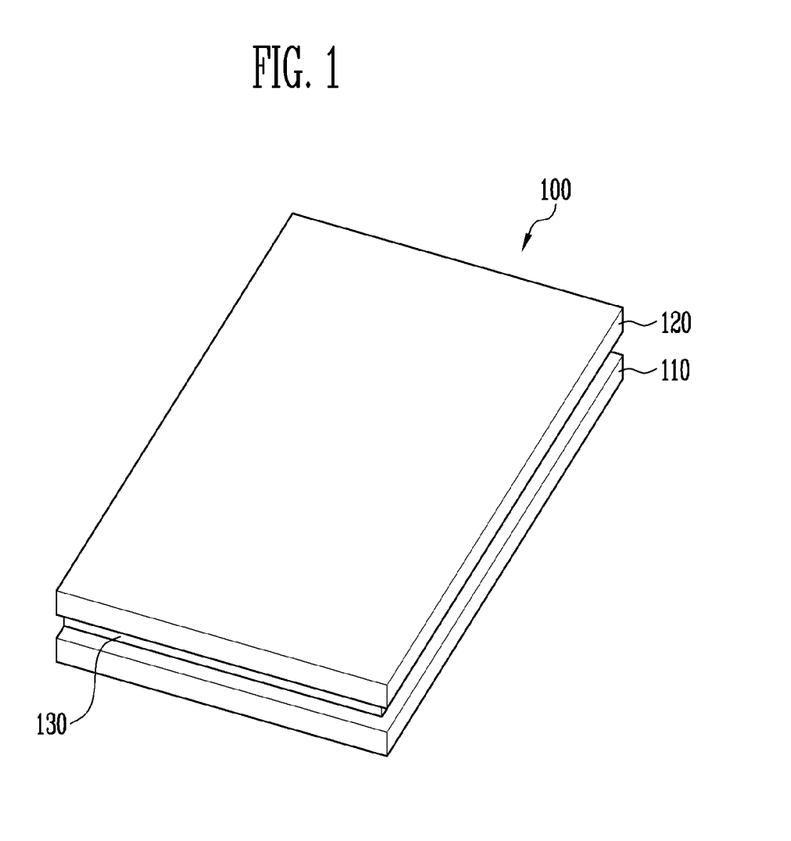
FIG. 1 is a perspective view of an exemplary embodiment of a display panel in accordance with the invention.
Figure 2:
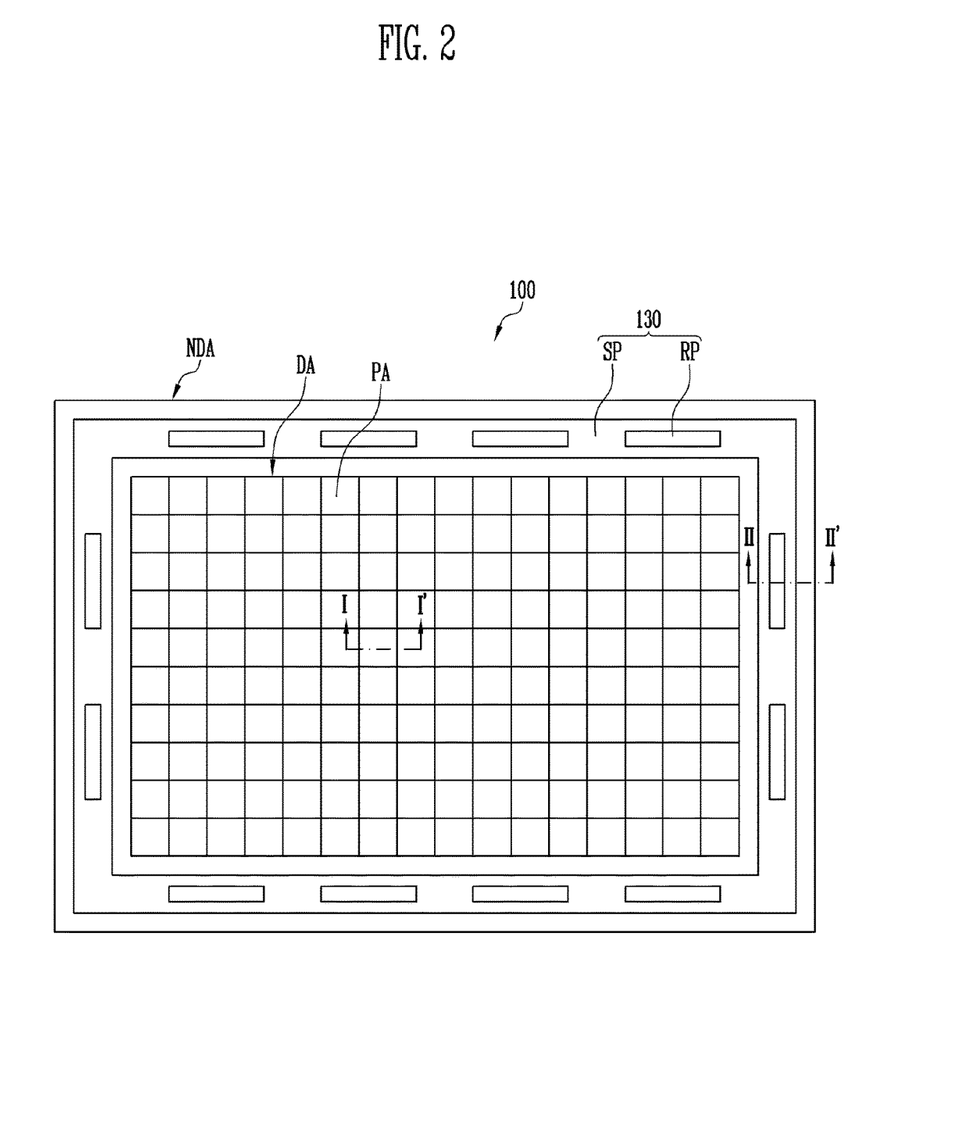
FIG. 2 is a plan view of the display panel shown in FIG. 1.
Figure 4:
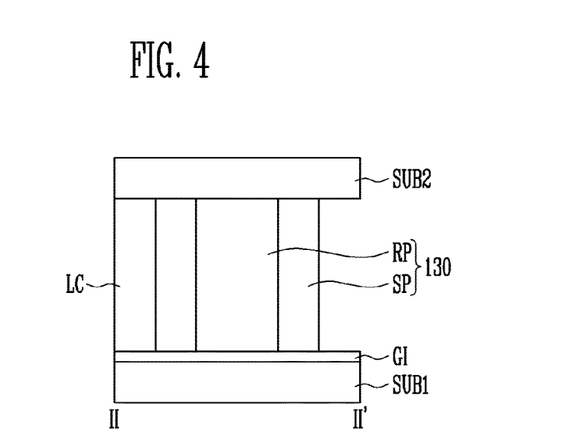
FIG. 4 is a cross-sectional view along line II-II' shown in FIG. 2.

The sealing member 130 may be disposed in the non-display area NDA. The sealing member 130 may attach the first display substrate 110 and the second display substrate 120 to each other. The sealing member 130 may include a sealing portion SP which reduces or effectively prevents the optical layer LC material from leaking to outside of the optical layer LC area (e.g., the display area DA), and a receiving portion RP provided in plural and in which is received a portion of the optical layer LC material. Portions of the sealing portion SP may define the receiving portions RP of the sealing member 130

The sealing portion SP may reduce or effectively prevent the optical layer LC material from leaking to the outside of the optical layer LC area. The sealing portion SP may include photo curable material or thermo curable material. In an exemplary embodiment, for example, but without limitation thereto, the sealing portion SP may include epoxy resin.

The receiving portions RP may be maintained in a vacuum state. If the optical layer LC material which is disposed in the display area DA exceeds the reference volume of the optical layer LC material to be disposed in the display area DA, the receiving portions RP may receive the excess optical layer LC material. Accordingly, where the excess optical layer LC material is received in the receiving portions RP, the optical layer LC material in the display area DA may not exceed the reference volume of the display area DA.

The receiving portions RP as a whole (e.g., in an entirety thereof) may receive a total optical layer LC material in a range from about 2 volume percent (vol %) to about 10 vol % of the reference volume. In an exemplary embodiment, for example, but without limitation thereto, the sealing member 130 may include two to ten receiving portions RP. Each of the receiving portions RP may receive the optical layer LC material in an amount of about 1 vol % of the reference volume.

As to the display panel 100, if the sealing member 130 includes the receiving portion RP and the optical layer LC material disposed in the display area DA exceeds the reference volume, the receiving portion RP may receive an amount of the optical layer LC material which exceeds the reference volume. Therefore, the display quality defect of the display panel 100, e.g., the yellowish phenomenon, may be reduced or effectively prevented.

Hereinafter, an exemplary embodiment of a method for manufacturing a display panel shown is described with reference to FIGS. 1 to 4.

Figure 5:
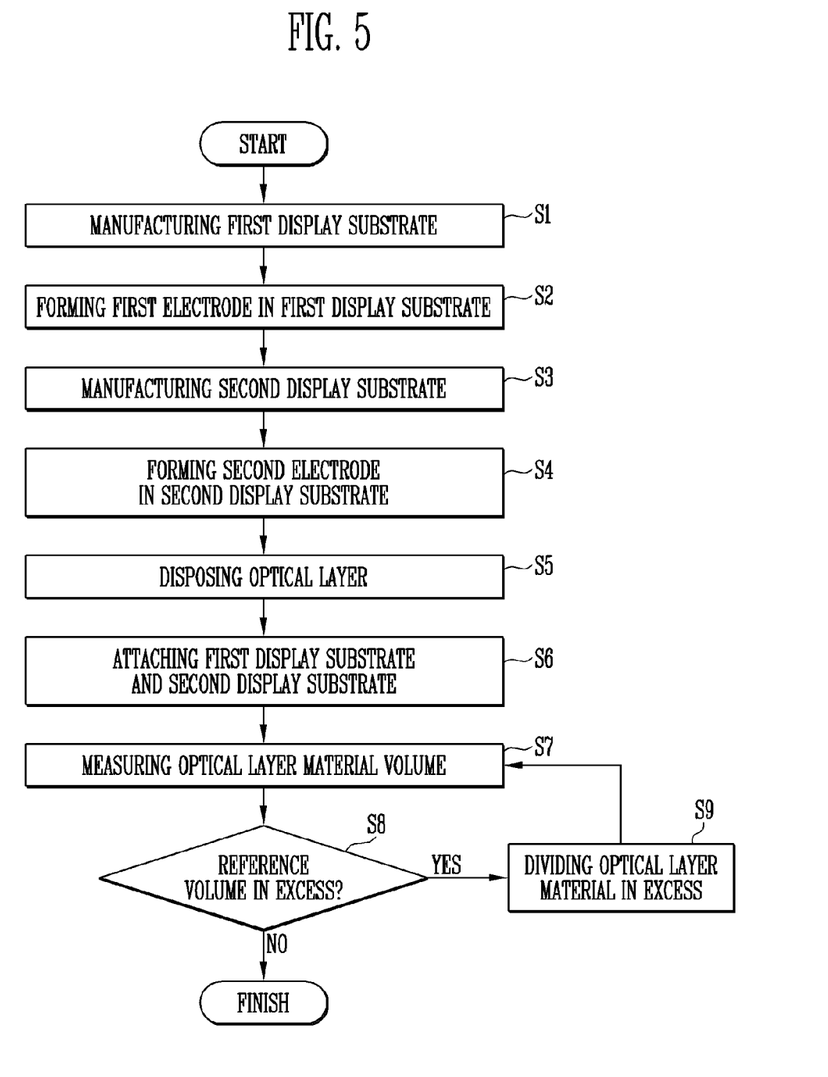
FIG. 5 is a process flow chart for illustrating an exemplary embodiment of a method of manufacturing the display panel shown in FIGS. 1 to 4.

FIG. 5 is a process flow chart for illustrating an exemplary embodiment of a method for manufacturing a display panel shown in FIGS. 1 to 4.

Referring to FIG. 5, an exemplary embodiment of a method for manufacturing a display panel includes manufacturing a first display substrate (S1), forming a first electrode in the first display substrate (S2), manufacturing a second display substrate (S3), forming a second electrode in the second display substrate (S4), disposing an optical layer (S5), attaching the first display substrate and the second display substrate to each other (S6), measuring a volume an optical layer material (S7), determining an excess of a reference volume of the optical layer material (S8) and dividing the optical layer material in excess (S9).

The method for manufacturing the display panel is described in further detail with reference to FIGS. 6 to 11. FIGS. 6 to 9 are taken along line I-I' of FIG. 2 and FIGS. 10 and 11 are taken along line II-II' of FIG. 2.

FIGS. 6 to 11 are process cross-sectional views for illustrating a method for manufacturing a display panel shown in FIGS. 1 to 5.

Figure 6:
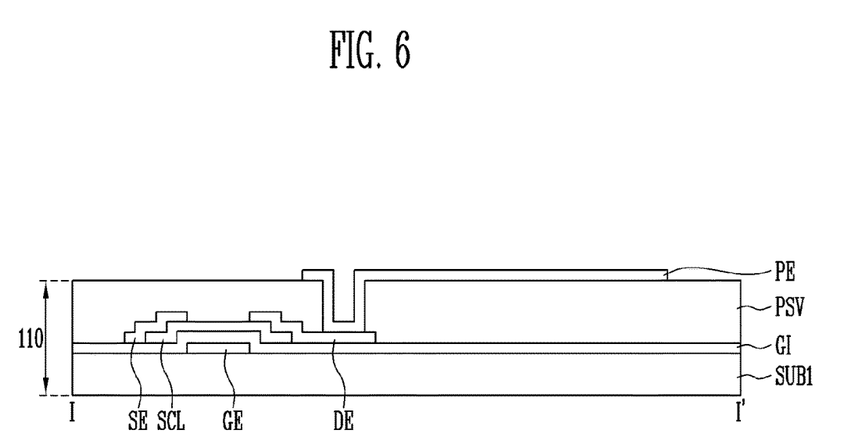
FIGS. 6 to 11 are process cross-sectional views for illustrating an exemplary embodiment of a method of manufacturing the display panel shown in FIGS. 1 to 5.

Referring to FIG. 6, in a process (S1) of manufacturing the first display substrate, a thin film transistor may be formed on a first base substrate SUB1 to manufacture a first display substrate 110.

The first base substrate SUB1 may include a display area DA and a non-display area NDA which is at a periphery of the display area DA. The display area DA may include a plurality of pixel areas PA arranged in matrix form. The first base substrate SUB1 may be a flexible substrate or a rigid substrate.

The thin film transistor may be disposed in the pixel area PA. Also, the thin film transistor may include a gate electrode GE, a semiconductor layer SCL, a source electrode SE and a drain electrode DE.

The thin film transistor may be manufactured as described below.

A gate electrode GE and a gate line may be formed on the first base substrate SUB1. The gate electrode GE may have a shape defined by a protruded portion of the gate line. The gate electrode GE defined by the protruded portion of the gate line is in a same layer as the gate line.

After the gate electrode GE and the gate line are formed, the gate insulating layer GI may be formed which covers the gate electrode GE and the gate line. The gate insulating layer GI may include at least one of silicon oxide (SiOx) or silicon nitride (SiNx). In an exemplary embodiment, for example, but without limitation thereto, the gate insulating layer GI may collectively include a first layer disposed on the gate electrode GE and the gate line and including silicon oxide and a second layer disposed on the first layer and including silicon nitride.

After the gate insulating layer GI is formed, a semiconductor material layer including a semiconductor material may be formed on the gate insulating layer GI, and a semiconductor layer SCL may be formed by patterning the semiconductor material layer. Here, the semiconductor layer SCL may include one of amorphous silicon (a-Si), polycrystalline silicon (p-Si) or oxide semiconductor.

After the semiconductor layer SCL is formed, a conductive layer may be formed by applying conductive material on the semiconductor layer SCL. Thereafter, a source electrode SE and a drain electrode DE, arranged spaced apart from each other, may be formed by patterning the conductive layer.

One end of the source electrode SE may be coupled to a data line which crosses the gate line. In an exemplary embodiment, for example, but without limitation thereto, the source electrode SE may have a shape defined by a protruded portion of the data line. An end of the source electrode SE opposing the one end thereof may be coupled to one end of the semiconductor layer SCL. The source electrode SE defined by the protruded portion of the data line is in a same layer as the data line.

One end of the drain electrode DE may be coupled to an end of the semiconductor layer SCL opposing the one end thereof.

After the thin film transistor is formed, a protective layer PSV that covers the thin film transistor may be formed. The protective layer PSV may include at least one of an inorganic insulating layer or an organic insulating layer. In an exemplary embodiment, for an example, but without limitation thereto, the protective layer PSV may collectively include an inorganic insulating layer covering the thin film transistor and an organic insulating layer disposed on the inorganic insulating layer. The inorganic insulating layer may collectively include at least one of silicon oxide or silicon nitride and may be formed through a deposition process. Also, the organic insulating layer may be formed by coating an organic insulating material on the inorganic insulating layer. Also, the protective layer PSV may expose the end of the drain electrode DE opposing the one end thereof, by being patterned.

In a process (S2) of forming a first electrode on the first display substrate, a first electrode PE which contacts the end of the drain electrode opposing the one end thereof may be formed on the protective layer PSV. The first electrode PE may form by disposing a transparent conductive layer including a transparent conductive oxide on the protective layer PSV. The first electrode PE may be formed by patterning the transparent conductive layer. The first electrode PE may include at least one of indium tin oxide ("ITO"), indium zinc oxide ("IZO"), aluminum zinc oxide ("AZO"), gallium doped zinc oxide ("GZO"), zinc tin oxide ("ZTO"), gallium tin oxide ("GTO") or fluorine doped tin oxide ("FTO").

Figure 7:
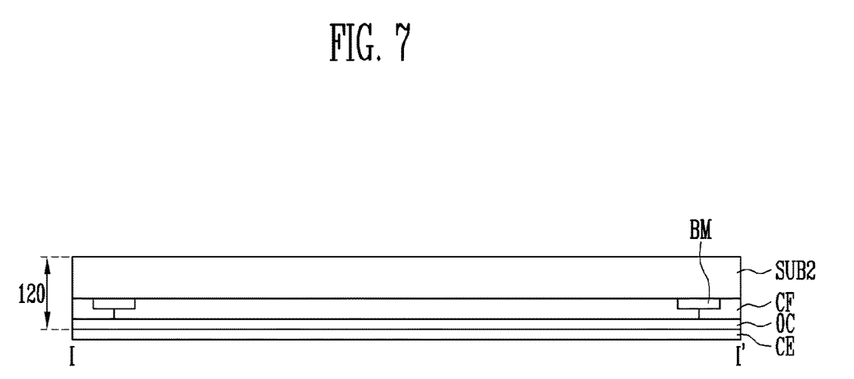

Referring to FIG. 7, in a process (S3) of manufacturing a second display substrate, a light blocking pattern BM, a color filter CF and an over-coating layer OC may be formed on a second base substrate SUB2 to form a second display substrate 120.

The second display substrate 120 may be manufactured as described below.

The light blocking pattern BM may be formed on the second base substrate SUB2. The second base substrate SUB2 may include a material that is the same as the first base substrate SUB1. That is, the second base substrate SUB2 may be a rigid substrate or a flexible substrate.

The light blocking pattern BM may be formed by disposing a light blocking material layer on one surface of the second base substrate SUB2 and by patterning the light blocking material layer. The light blocking pattern BM may be disposed corresponding to a boundary of the pixel areas PA on one surface of the second base subtract SUB2.

After the light blocking pattern BM is formed, the color filter CF may be formed on the second base substrate SUB2 at an area of the second base substrate SUB2 which is exposed by the light blocking pattern BM, that is, of an area corresponding to the pixel area PA. The color filter CF may be formed by coating an organic insulating material in which a dye or a pigment is diffused, on the second base substrate SUB2. Here, the color filter CF may have one color among red, green, blue, cyan, magenta or yellow colors.

After the color filter CF is formed, the over-coating layer OC may be formed on the color filter CF. The over-coating layer OC may cover the color filter CF and reduce a height (e.g., step) difference due to the light blocking pattern BM and the color filter CF disposed adjacent to each other.

In a process (S4) of forming a second electrode on the second display substrate, a second electrode CE may be formed on the over-coating layer OC. The second electrode CE may include a material which is the same as the first electrode PE. That is, the second electrode CE may include at least one of indium tin oxide ("ITO"), indium zinc oxide ("IZO"), aluminum zinc oxide ("AZO"), gallium doped zinc oxide ("GZO"), zinc tin oxide ("ZTO"), gallium tin oxide ("GTO") or fluorine doped tin oxide ("FTO").

Figure 8:
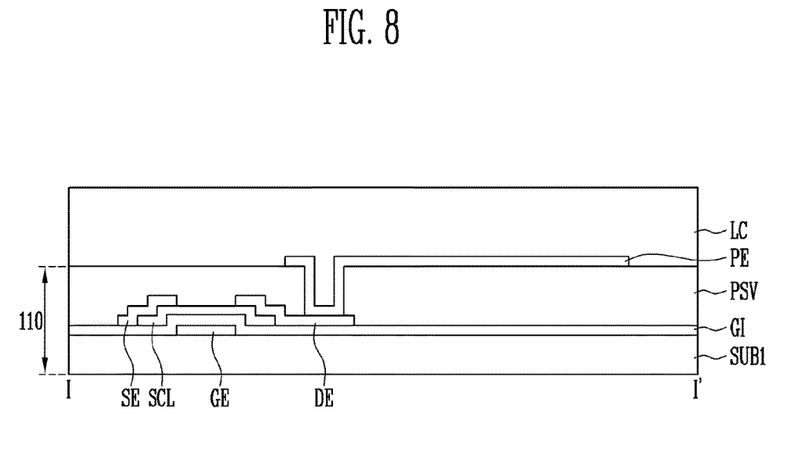

Referring to FIG. 8, in a process (S5) of disposing the optical layer, the optical layer LC may be disposed at a position which will be between the first display substrate 110 on which the first electrode PE is formed and the second display substrate 120 on which the second electrode CE is formed. While FIG. 8 shows the optical layer LC disposed on the first display substrate 110 having the first electrode PE thereon, the invention is not limited thereto. In an exemplary embodiment, the optical layer LC may be disposed on the second display substrate 120 having the second electrode CE thereon.

The optical layer LC may be a liquid crystal layer. The optical layer LC as a liquid crystal layer includes a plurality of liquid crystals. The liquid crystals may be arranged in a certain direction due to an electric field applied thereto and may adjust transmittance therethrough of light provided from an external device, e.g., from a backlight unit. Therefore, the optical layer LC may allow the display panel to display images using the light provided from the backlight unit.

Figure 9:
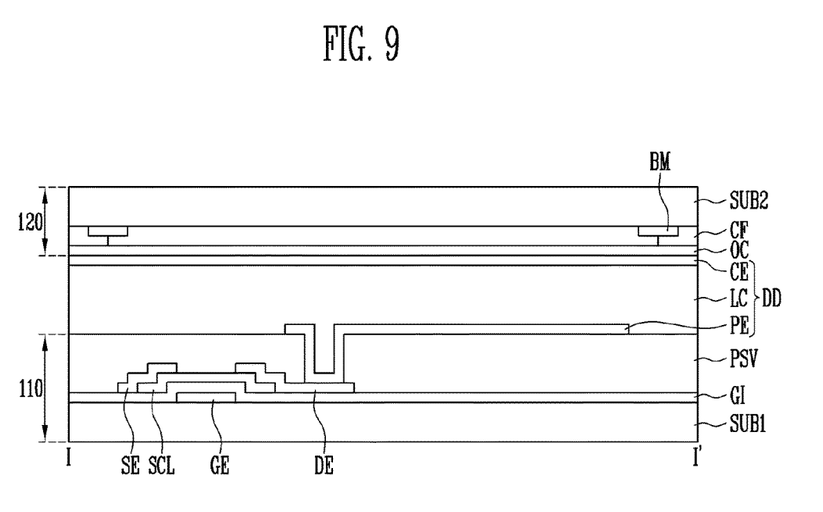
Figure 10:
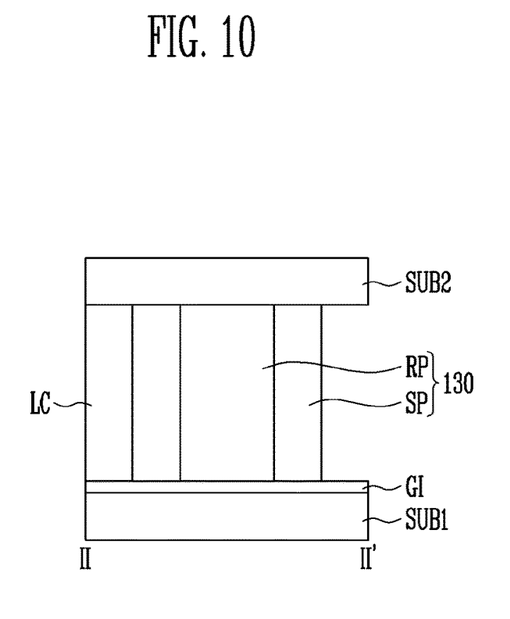
Figure 11:
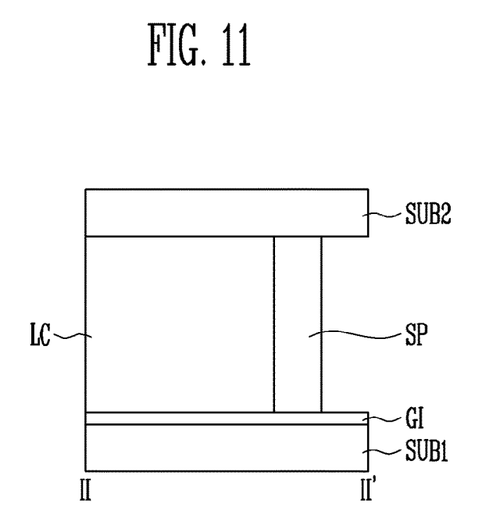

Referring to FIGS. 9 and 10, in a process (S6) of attaching the first display substrate and the second display substrate to each other, a display panel 100 may be manufactured by attaching the first display substrate 110 having the first electrode PE thereon and the second display substrate 120 having the second electrode CE thereon to each other, by using the sealing member 130.

The sealing member 130 may be disposed in the non-display area NDA of the first display substrate 110 and/or the second display substrate 120. The sealing member 130 may define a sealing portion SP thereof which reduces or effectively prevents movement of the optical layer LC material disposed in the display area DA to outside the display area DA, and a receiving portion RP thereof provided in plural which is capable of receiving a portion of the optical layer LC material. The sealing portion SP of the sealing member 130 may be disposed in the non-display area NDA of the first display substrate 110 and/or the second display substrate 120 before the first and second display substrates 110 and 120 are attached to each other.

The sealing portion SP may reduce or effectively prevent the optical layer LC material from leaking to the outside of the optical layer LC area. The sealing portion SP may include photo curable material or thermo curable material. In an exemplary embodiment, for example, but without limitation thereto, the sealing portion SP may include epoxy resin.

Referring to FIGS. 2 and 10, the forming of the sealing portion SP may include defining an opening provided in plural therein. In the direction along adjacent portions of the sealing portion SP may be spaced apart from each other to define the opening which will become a receiving portion RP of the sealing member 130. In the direction II-II', along one of the adjacent portions of the sealing portion SP is disposed to border the display area DA (e.g., LC in FIG. 10). By disposing the first display substrate 110 and the second display substrate 120 to face each other, the receiving portions RP are defined with the opening in the sealing member 130. The receiving portions RP are initially disconnected from a volume of the display area DA.

The receiving portions RP may be maintained in a vacuum state. If the optical layer LC material in the display area DA exceeds the reference volume of the optical layer LC material to be disposed in the display area DA, the receiving portions RP may receive the excess optical layer LC material. Accordingly, where the excess optical layer LC material is received in the receiving portions RP, the optical layer LC material in the display area DA may not exceed the reference volume of the display area DA or the optical layer LC material to be disposed in the display area DA.

The receiving portions RP as a whole may receive a total optical layer LC material in a range from about 2 vol % to 10 vol % of the reference volume. In an exemplary embodiment, for example, but without limitation thereto, the sealing member 130 may include two to ten receiving portions RP. Each of the receiving portions RP may receive the optical layer LC material in an amount of about 1 vol % of the reference volume.

In a process (S7) of measuring and determining the volume of the optical layer LC material disposed on the respective display substrate, display quality of the display panel 100 may be checked such as by applying power to the display panel 100.

In a process (S8) of determining excess of reference volume of the optical layer LC material disposed on the respective display substrate, it may be determined whether the optical layer LC material exceeds the reference volume and is disposed in a proper volume in the display area DA such as by checking display quality.

If there is nothing wrong with display quality of the display panel 100 (e.g., the display quality meets a predetermined standard or no display defect is observed), it may be determined that the volume of the optical layer LC material disposed in the display area DA conforms to the reference volume and that there is no excess. Where it is determined that there is no excess optical layer LC material in the display area DA, the receiving portions RP of the sealing member 130 may remain separated (e.g., disconnected) from the display area DA. Referring to FIG. 10, for example, the volume of the display area DA (e.g., where LC is indicated) is not connected to the volume of the receiving portion RP.

However, if a display quality defect is observed with the display panel 100, it may be determined that the optical layer LC material disposed in the display area DA exceeds the reference volume. In an exemplary embodiment, for example, but without limitation thereto, if the optical layer LC material exceeds the reference volume, a display defect such as a yellowish phenomenon may occur with an image displayed by the display panel 100.

Referring to FIG. 11, in a process (S9) of dividing the optical layer LC material in excess, if the optical layer LC material is determined to exceed the reference volume, the excess optical layer LC material may be received by one or more of the receiving portions RP of the sealing member 130. In an exemplary embodiment, for example, but without limitation thereto, if the optical layer LC material exceeds the reference volume, a laser may be irradiated on a side surface of the sealing member 130 at one or more portions of the sealing portion SP adjacent to the optical layer LC. Referring to FIGS. 10 and 11, among adjacent portions of the sealing portion SP which define a receiving portion, the portion bordering the optical layer LC may be irradiated and removed, thereby exposing an inner area of the receiving portion RP to the display area DA and thus opening the side surface of the sealing member 130. In an exemplary embodiment, for example, but without limitation thereto, if the optical layer LC material in the display area DA exceeds 5 vol % of the reference volume, the side surface of the sealing member 130 at five of the receiving portions RP may be opened to the display area DA.

When the side surface of the sealing member 130 is opened, some of the optical layer LC material in the display area DA may spread to the receiving portion RP of which an inner area thereof is connected to the display area DA. Referring to FIG. 11, for example, where a portion of the sealing member 130 is removed, the volume of the display area DA (e.g., where LC is indicated) is connected to the volume of the receiving portion RP (see FIG. 10). Accordingly, since the amount of the optical layer LC material in the display area DA is reduced by an amount which spreads the exposed receiving portion RP, the optical layer LC material in the display area DA may be disposed in conformity to the reference volume with respect to the display area DA. Therefore, the display quality defect of the display panel 100 may be reduced or effectively prevented.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A display panel comprising:
a first display substrate including a display area and a non-display area which is at a periphery of the display area;
a second display substrate facing the first display substrate;
a display device disposed in the display area between the first display substrate and the second display substrate, the display device including a first electrode, an optical layer including an optical layer material, and a second electrode; and
a sealing member which is disposed in the non-display area to border the display area and attaches the first display substrate and the second display substrate to each other,
wherein the sealing member comprises:
a sealing portion which prevents the optical layer material of the optical layer from moving outside the display area; and
a plurality of receiving portions disconnected from each other and defining closed spaces in the sealing portion.

2. The display panel as claimed in claim 1, wherein for a reference volume of the optical layer material defined for the display area, an entirety of the receiving portions receives an amount of the optical layer material in a range of about 2 volume percent to about 10 volume percent with respect to the reference volume.

3. The display panel as claimed in claim 2, wherein the sealing member defines two to ten of the receiving portions.

4. The display panel as claimed in claim 3, wherein each of the receiving portions receives the optical layer material in an amount of about 1 volume percent of the reference volume of the optical layer material defined for the display area.

5. The display panel as claimed in claim 1, wherein the sealing member includes a photo curable material or a thermo curable material.

6. The display panel as claimed in claim 1, wherein the optical layer comprises a plurality of liquid crystals.

7. The display panel as claimed in claim 6, wherein the first electrode is disposed in the first display substrate and the second electrode is disposed in the second display substrate.

8. The display panel as claimed in claim 1, wherein a volume of a receiving portion among the plurality of receiving portions is connected to a volume of the display area.

9. A method for manufacturing a display panel comprising:
providing a first display substrate by forming a thin film transistor on a first base substrate, the first display substrate including a display area and a non-display area which is at a periphery of the display area;
forming a first electrode on the first display substrate, the first electrode contacting the thin film transistor in the first display substrate;
forming a second electrode in a second display substrate including a second base substrate;
disposing an optical layer including an optical layer material, in the display area and between the first electrode which is on the first display substrate and the second electrode which is on the second display substrate; and
attaching the first display substrate and the second display substrate to each other using a sealing member in the non-display area and between the first and second display substrates,
wherein the sealing member comprises:
a sealing portion which prevents the optical layer material of the optical layer from moving outside the display area; and
a plurality of receiving portions disconnected from each other and defining closed spaces in the sealing portion.

10. The method as claimed in claim 9, with respect to a reference volume of the optical layer material defined for the display area,
further comprising:
measuring a volume of the optical layer material in the display area; and
determining whether a volume of the display area optical layer material exceeds the reference volume thereof.

11. The method as claimed in claim 10, further comprising redistributing the display area optical layer material if the volume of the display area optical layer material exceeds the reference volume thereof.

12. The method as claimed in claim 11, wherein the redistributing of the display area optical layer material comprises:
connecting a volume of the display area to a volume of a receiving portion among the plurality of receiving portions by removing a portion of the sealing member at the border of the display area, the portion of the sealing member defining the receiving portion, and
moving an amount of the display area optical layer material to the receiving portion of which the volume thereof is connected to the volume of the display area.

13. The method as claimed in claim 9, wherein with respect to a reference volume of the optical layer material defined for the display area, an entirety of the plurality of receiving portions receives the optical layer material in a range of about 2 volume percent to about 10 volume percent of the reference volume.

14. The method as claimed in claim 13, wherein the sealing member defines two to ten of the receiving portions.

15. The method as claimed in claim 14, wherein each of the receiving portions receives the optical layer material in an amount of about 1 volume percent of the reference volume of the optical layer material defined for the display area.

16. The method as claimed in claim 9, wherein the optical layer comprises a plurality of liquid crystals.

17. The method as claimed in claim 16, wherein the first electrode is disposed in the first display substrate and the second electrode is in the second display substrate.

* * * * *